United States Patent [19]

Schmidt

[11] Patent Number: 4,892,447

[45] Date of Patent: Jan. 9, 1990

[54] TORQUE RESTRAINING DEVICE FOR DRILL WITH SELF-ATTACHING BASE

[75] Inventor: John Schmidt, Palm Harbor, Fla.

[73] Assignee: Everett D. Hougen, Flint, Mich.

[21] Appl. No.: 153,686

[22] Filed: Feb. 8, 1988

[51] Int. Cl.[4] ............................................ B23B 47/00

[52] U.S. Cl. .................................... 408/76; 408/72 R

[58] Field of Search ........................... 408/76, 5, 72 R; 83/140; 269/8, 102

[56] References Cited

U.S. PATENT DOCUMENTS

| | | | |
|---|---|---|---|
| 2,826,950 | 3/1958 | McClintock | 81/16 |
| 4,261,673 | 4/1981 | Hougen | 408/76 X |
| 4,440,052 | 4/1984 | Weisbeck | 83/140 |

*Primary Examiner*—Z. R. Bilinsky
*Assistant Examiner*—R. S. Schultz
*Attorney, Agent, or Firm*—Dykema Gossett

[57] ABSTRACT

The present invention discloses a torque restraining device to resist the lateral shifting or rotation of a self adhering drill unit due to the torque generated by the drill motor. The torque restraining device includes a penetrating member mounted on the bottom of the drill unit for penetrating the work surface to prevent rotation of the drill unit during use. The penetrating member is embedded by the action of the drill unit being pulled to the work surface when the mounting base of the drill unit is activated. In the preferred embodiments, a protective sleeve is reciprocally mounted about the penetrating member to encase the penetrating member to prevent damage when the base is not activated. Upon activating the base, the sleeve retracts to expose the penetrating member for penetration into the work surface. The protective sleeve or glide post protects the conical end of the penetrating member and when the base is not activated lifts the rear of the drill unit from the work surface to disengage the penetration member and to facilitate easy sliding of the drill unit. In a further embodiment of the invention, a driving means is included to facilitate penetration.

30 Claims, 2 Drawing Sheets

TORQUE RESTRAINING DEVICE FOR DRILL WITH SELF-ATTACHING BASE

BACKGROUND OF INVENTION

The present invention relates to portable drill units that are provided with a magnetic base, suction cup or other device to attach the drill unit to a work surface. More particularly, the present invention relates to a torque restraining device for resisting movement of the drill unit during operation. For clarity, the invention will be described with respect to a drill unit having an electromagnetic base. However, it should be understood that the electromagnet could be replaced by suction cups or equivalent means to make the portable drill unit self attaching.

Basically, a magnetic base drill is a portable drill press. It includes an electromagnet, a support affixed to the electromagnet and an electric drill motor reciprocally mounted to the support member so that it can be raised and lowered with respect to the work surface. The electromagnet is energized to create a magnetic flux between the electromagnet and the work surface to magnetically adhere the magnetic base drill to the work surface. In this way, holes may be drilled in a work surface at remote locations where a standard drill press could not be taken. Common uses for magnetic base drills are in the construction and repair of bridges, high-rise buildings, etc.

The torque of a magnetic base drill causes a twisting or torsional force which must be resisted by the magnetic base of the drill. The motor of the magnetic base drill produces high torques when loaded down, tremendous torques when bogged down and even greater torques when the motor is stalled. The highest torque, the torque obtained when the motor is stalled, is called the stall torque and occurs when the rotation of the motor is stopped or stalled in the work. This stall torque is significantly higher than normal operating torques of the motor. Unless the magnet of the magnetic base drill resists all of these torques, the magnetic base drill may slip or even break away from the work surface and spin out of control.

The electromagnet of a magnetic base drill creates a strong normal force to attract the drill to the work surface, but consderably less force to resis rotation. With standard magnetic base drills, not including a torque restraining device, the electromagnet cannot adequately resist this twisting rotation resulting in inadvertent movement.

An early attempt at solving the problem of inadvertent rotation of magnetic base drills is disclosed in U.S. Pat. No. 2,622,457 to Buck. Buck attempted to solve the problem by using two magnets spaced from one another. The difficulty with this attempt is the fact that magnets have very little resistance to torsional movement. Even though one of the magnets is spaced a distance from the other, the resistance to torsional movement is not greatly enhanced.

United States Patent No. 4,261,673, issued to Everett D. Hougen discloses a solution to the problem of inadvertent rotational movement. The solution involves the driving of a torque restraining device into the work surface to prevent rotational movement. It was discovered by Mr. Hougen that the amount of penetration needed to resist rotation is relatively small, even though the stall torque of the motor was very great. Mr. Hougen discovered a synergistic effect between a torque restraining pin that penetrates the work surface and the magnetic attraction of an electromagnet. Neither the magnet nor the torque pin when used separately provided enough resisting torque. When used together, the resistance torque was greater than the sum of the torque resistance provided by the pin and magnet and was found to be enough to prevent rotation and resist the stall torque of the motor. With a slight penetration of the pin and the force of the electromagnet, the resistance to rotation is dramatically increased over the available resistance from the electromagnet alone. As disclosed in the '673 patent, there are several different ways to drive the torque restraining device into the surface.

In addition to the torque restraining pin, the '673 patent discloses the use of a roller to permit the magnetic base drill to be easily aligned over the place where a hole is to be drilled. (This roller is also disclosed in U.S. Pat. No. 3,969,036.) Many times, holes must be drilled at exact predetermined locations and alignment is crucial. By using the roller, the drill can be easily slid across the work surface to each location and aligned. Further, the ability to slide the magnetic base drill across the work surface clears away metal chips which have been left on the surface during drilling. The front of the magnetic base drill with the rear raised by the roller acts as a scraper to clear the work surface of metal chips to provide a better surface for the magnet to adhere.

A disadvantage of the torque restraining device of the '673 patent is the exposed torque restraining pin. If the magnetic base drill is handled roughtly, there is the possibility that the torque restraining pin may be dulled. The penetration of the torque restraining pin may be only about 0.015 inches, and therefore a dull or chipped pin may be insufficient to restrain the torque generated. Commonly, the operator's manuals for drill presses of this type advise the operator to maintain the sharpness of the pin.

A further disadvantage of the '673 patent is the use of a separate torque restraining device and plunger. This requires a larger mounting area which increases the size, weight and manufacturing cost of the magnetic base drill. Still further, positioning the torque restraining device and/or plunger of the magnetic base drill center line can be disadvantageous in some applications. By combining the torque pin and glide or protective member into one unit both can be located where they are most effective, for example, along the center line of the magnet when used on tubing.

BRIEF SUMMARY OF THE INVENTION

The present invention overcomes the disadvantage of an exposed torque pin as found in the '673 Hougen patent and provides the additional benefit of a single torque restraining member which provides restraint against rotational movement and a glide member for moving the unit. This eliminates the need for a separate glide roller and torque restraining device.

The torque restraining device of the present invention has a penetrating member or torque pin mounted on the bottom of the magnetic base drill for penetrating the work surface to prevent rotation of the magnetic base drill during use. A protective member is reciprocally mounted about the torque pin and axially moves with respect to the torque pin. The protective member is retractable to expose the penetrating member for penetration into the work surface.

When the magnet is not energized, the protective member encases the torque pin to prevent damage to the end of the pin. When the magnet is energized, the protective member retracts to expose the torque pin.

Preferably, the penetrating member is fixed to protrude beyond the bottom of the magnetic base drill for penetration into the work surface. Preferably, the protective member is a sleeve which is biased by a spring or equivalent biasing means to protrude beyond the bottom of the magnetic base and the penetrating member. The bias of the spring against the protective sleeve lifts the magnetic base drill with respect to the work surface when the magnet is not energized. Furtner, in the preferred embodiment, the end of the protective sleeve is rounded so that the magnetic base drill can be more easily slid upon the work surface so that it functions in a manner similar to the roller of the '673 Hougen patent.

In the most preferred embodiment, the torque restraining device includes a bracket which can be easily mounted to the rear of a magnetic base drill, spacing the torque restraining device as far as practical from the drill but or cutting tool axis to provide maximum torque resistance. This bracket has a bore extending through it. The bore has two portions; a first portion which extends from the top partially through the mounting bracket and ends in a second portion. The second portion extends from the first portion through the bottom of the mounting bracket. The second portion has a smaller diameter than the first portion which creates a support ledge at the adjoining ends of the first and second portions. The protective sleeve includes a flange which is configured to rest upon this supporting ledge. In this way, the protective sleeve is retained within the bore and is free to reciprocate within the bore.

In the preferred embodiment, the torque pin includes an upper head portion and a depending shaft with an end for penetrating the work surface, such as a pointed or conical end. The shaft is received within the bore of the protective sleeve so that the protective sleeve can reciprocate with respect to the torque pin. The spring is mounted to bias against the upper portion of the torque pin.

In a further embodiment of the present invention, a driving means is provided to facilitate the penetration of the torque pin. In one embodiment, the torque pin is machined from a larger diameter rod which is threaded into the mounting bracket so that the machined penetrating pin extends below the bottom of the mounting bracket. In this embodiment, the magnet draws the pin into the work surface, and the rod is adapted to be driven or impacted to further penetrate the pin. A locking nut is threaded onto the rod to help absorb the impact. In another embodiment, a slide hammer can be mounted to the opposite end of the machined rod above the mounting bracket or above the head portion of the torque pin previously discussed. The protective sleeve is similar to the protective sleeve of the preferred embodiment in that it reciprocates with respect to the penetrating pin. When the magnetic base drill is energized the penetrating pin is pulled into the surface and then to assure full penetration or if greater penetration is desired the slide hammer can be raised and lowered rapidly against a locking nut ont he shaft or the mounting bracket to drive the torque pin further into the surface.

In a still further embodiment of the present invention, the protective member is a coil spring which is mounted about the torque pin. The spring is preferably mounted with a bore which opens from the bottom of the magnetic base drill. However, a bore is not necessary as the spring could be mounted to the base of the magnetic base drill, if for example, the base of the drill is offset vertically to provide clearance for the spring when retracted or compressed. The spring has sufficient bias to raise the magnetic base with respect to the work surface when the magnet is de-energized and will permit the drill to be more easily slid along the work surface similar to the protective sleeve of the preferred embodiment.

Other advantages and meritorious features of the present invention will be more fully understood from the following description of the invention, the appended claims, and the drawings, a brief description of which follows.

DETAILED DESCRIPTION OF THE INVENTION

Figure 1:
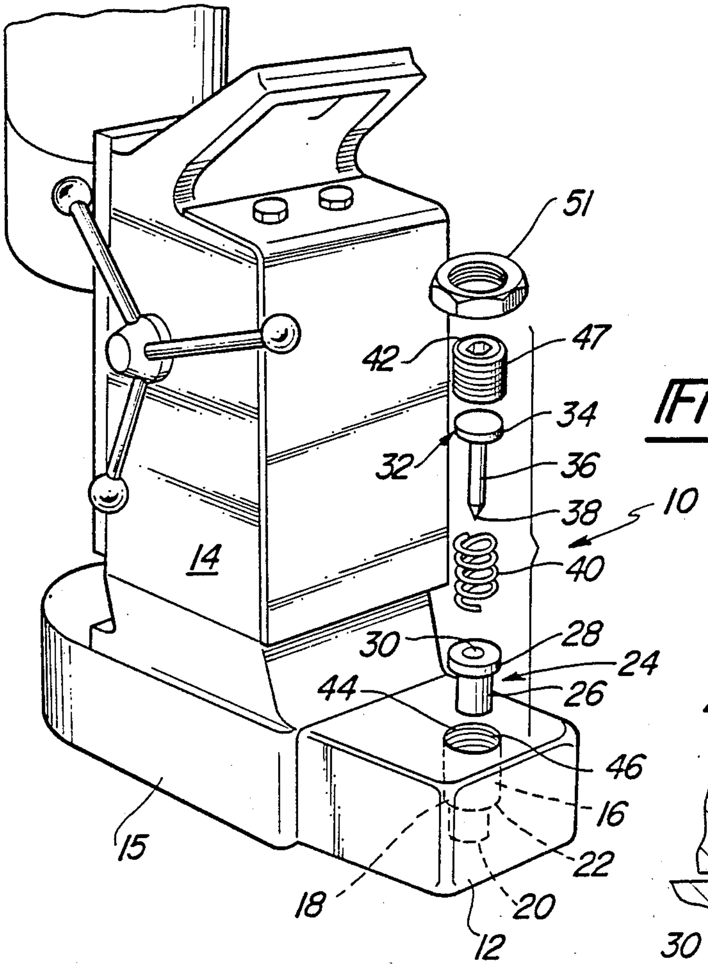
FIG. 1 is a perspective view of a magnetic base drill with the torque restraining device of the present invention shown in an exploded view.

With reference to FIG. 1, the torque restraining device of the present invention is shown generally at 10 mounted within a rear support bracket 12 which is fixed to the rear of a magnetic base drill 14. Rear mounting bracket 12 may be integrally formed with the magnet portion 15 of drill 14 of it may be affixed by bolts or other conventional connecting means.

Bracket 12 includes a bore 16 extending through the top to the bottom of bracket 12. This bore has first and second communicating portions 18 and 20 respectively. Portion 18 extends partially through bracket 12 and ends in second portion 20 which extends the remaining distance of bracket 12. The inner diameter of the first portion 18 is greater than the inner diameter of the second portion 20 forming a support ledge 22 at the adjoining ends of the first and second portions 18 and 20 respectively.

Figure 2:
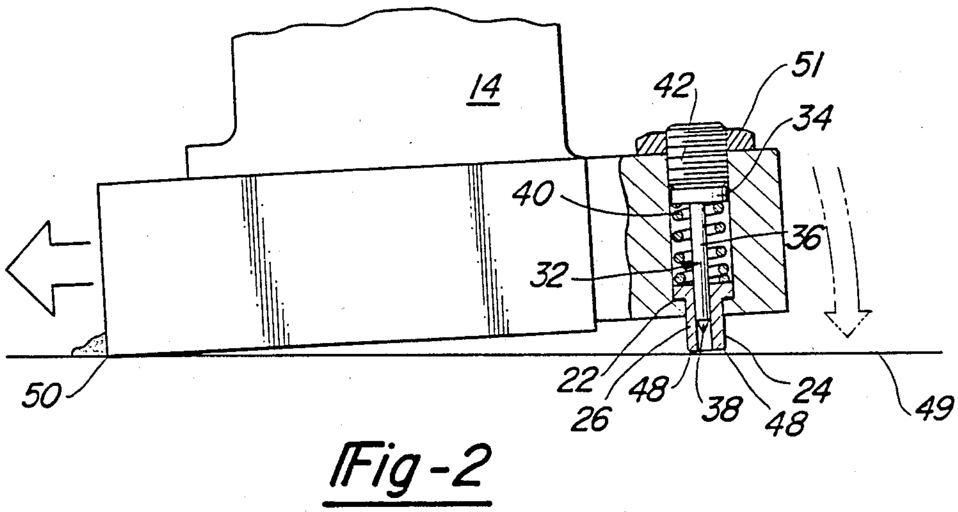
FIG. 2 is a partial side view of a magnetic base drill employing the torque restraining device of the present invention.

Torque restraining device 10 is mounted within longitudinal bore 16. Device 10 includes a glide post or protective sleeve 24 which has a tubular body portion 26 and a flange 28. Flange 28 has an outer diameter which is slightly less than the inner diameter of the first portion 18 of bore 16. The outer diameter of tubular body portion 26 is slightly less than the inner diameter of second portion 20. Glide post 24 normally rests upon support ledge 22 but is free to reciprocate within bore 16. With reference to FIG. 2 it can be seen that when glide post 24 is resting upon support ledge 22, tubular body portion 26 protrudes below the bottom of bracket 12.

Mounted within bore 30 of glide post 24 is torque reactor 32. Preferably, reactor 32 has an upper, top or head portion 34 and a body portion 36 having an end which is configured to penetrate the work surface, such as for example a conical end or point 38. Mounted between head portion 34 and flange 28 of glide post 24 is a biasing means 40 to normally bias the torque reactor point 32 and glide post 24 in opposite directions. In the disclosed embodiment, biasing means 40 is a coil spring which has sufficient resiliency to force glide post 24 against support ledge 22 and raise the magnetic base drill 14 with respect to the work surface as shown in FIG. 2.

A locking plug 42 is mounted in the top internally threaded portion of bore 16 to retain the spring biased members within bracket 12 and to adjust the protrusion of reactor point 32 beyond the base of the drill. In the preferred embodiment, the upper portion of bore 16 is counter sunk at 44 and has internal threads 46 for receipt of threads 47 of plug 42. A lock nut 51 is threaded onto threads 47. Alternatively, plug 42 and head portion 34 could be integrally formed with plug 42, forming the head of reactor 32 with body portion 36 depending therefrom.

With reference to FIG. 2, the glide post 24 is shown in its normal position wherein it raises the rear of magnetic base drill 14 with respect to the work surface 49. The free end of the glide post 24 is preferably rounded at 48 so that the magnetic base drill 14 can be freely moved with respect to work surface 49. In this way, the end 38 of torque reactor point 32 is protected from abuse and the magnetic base drill 14 can be easily moved with respect to surface 49. An additional benefit is the contact of the front 50 of magnetic base drill 14 with work surface 49. The front 50 acts as a scraper to clear away any debris on the work surface which may interfere with the magnet 15 adhering to the work surface. Since magnetic base drills of this type are used on metal surfaces, large amounts of oil are needed to reduce heat in the cutting operation and metal chips result from the cutting operation. The chips and oil litter the work surface and interfere with the magnet 15. The combination of glide post 24 lifting the rear of the magnetic base drill 14 and the contact of the front 50 with the work surface scrapes the work surface as the drill is moved to provide a clean surface for electromagnet 15.

Once the magnetic base drill 14 is properly aligned for cutting a hole, the electromagnet 15 is energized which pulls the electromagnet 15 flush with the work surface 49 and simultaneously drives the end 38 of reactor 32 into the work surface. As the magnetic base drilll 14 is pulled to the surface, glide post 24 retracts within bracket 12 compressing spring 40 against head portion 34. Post 24 is retracted to expose the end 38 of reactor 32. The compression of spring 40 and its action against head portion 34 results in torque reactor point 32 being substantially rigid with bracket 12 facilitating penetration of end 38.

Figure 3:
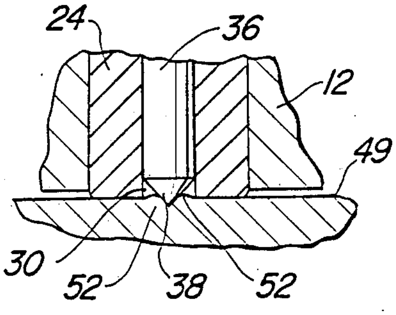
FIG. 3 is a partial cut away view of the torque restraining device of the present invention penetrated into the work surface.

With reference to FIG. 3, point 38 is shown penetrating work surface 49. As can be seen, the penetration of point 38 creates bulges 52 in the work surface which are squeezed into the bore 30 of glide post 24. This bulge of material 52 protruding into the bore 30 of glide post 24 enhances the resistance of the unit to rotation or skidding about the cutting tool of the magnetic base drill.

Upon de-energizing the magnetic base drill, spring 40 biases glide post 24 in the direction of the work surface to raise the rear of magnetic base drill 14. This pulls conical point 38 out of the work surface releasing the magnetic base drill 14 for movement along the work surface. Once released, the magnetic base drill 14 may be pushed across the work surface to clean a path for the electromagnet 15 and to locate the cutting tool (not shown) to cut another hole.

Figure 4:
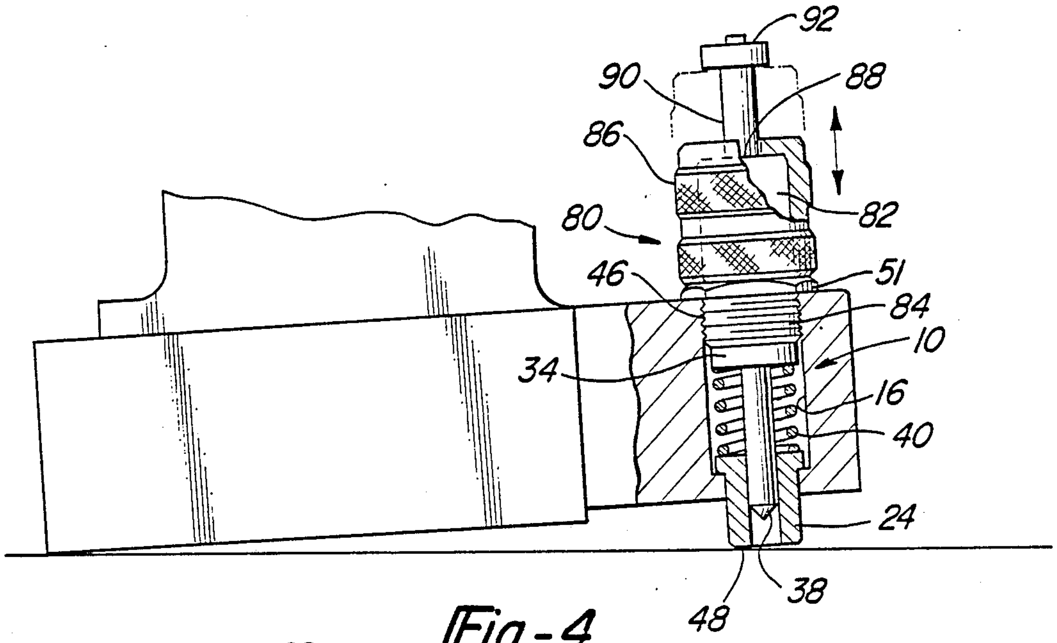
FIG. 4 is a cut away view of the torque restraining device of the present invention which is similar to the preferred embodiment except that a driving means is added to facilitate penetration of the torque pin.

With reference to FIG. 4, a further embodiment of the present invention is illustrated. In this embodiment, the restraining member is again shown generally at 10 with similar elements having identical numbering. In this embodiment, a penetration enhancer has been added to the torque restraining device. In some applications, it may be necessary to add an enhancing means to ensure proper penetration of end 38 for proper resistance. In this embodiment, instead of using plug 42, driving member 80 has been added. Member 80 includes a rod 82 which has a threaded end 84 that is threaded into the threaded opening 46 of bore 16. A slide hammer 86 is mounted over rod 82. Hammer 86 can be raised and then lowered rapidly to further drive end 38 into the work surface after the magnet is energized. The slide hammer 86 includes a bore 88 which is received over a guide portion 90 and fixed to rod 82 by a locking cap and screw 92.

The location of impactor 80 as illustrated in FIG. 4 is not critical. As will be understood, however, the torque restraining device should be spaced as far as practical from the drill bit or cutting tool to obtain the maximum mechanical advantage, preferably at the rearward portion of the magnet 15. Additionally, the alignment of torque restraining device 10 is not critical. It is shown positioned along the longitudinal center line of magnetic base drill 14 which is the preferred position; however, other locations of the impactor are within the scope of this invention because location on the center line is not critical.

Figure 5:
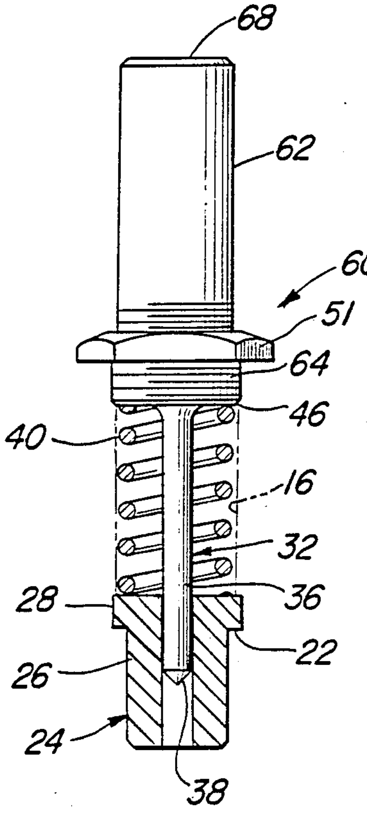
FIG. 5 is a cross-sectional view of a further embodiment of the present invention.

With reference to FIG. 5, a further embodiment of the present invention is illustrated. In this embodiment, the torque restraining device is generally shown at 60. Elements which are similar to those previously discussed have the same number. The torque reactor point 32 of the present embodiment is formed by machining a cylindrical rod 62 to form the body portion 36 and end 38 of the reactor point 32. Just above the torque restraining point 32, rod 62 is threaded at 64 to form the head of reactor point 32 for receipt in the threaded opening 46 of bore 16. The glide post 24 is identical to the previous glide post and has a tubular body 26 and flange 28 which rests upon a support ledge 22. In this embodiment, the top 68 of rod 62 may be hit downwardly to further penetrate end 38 into a work surface after the electromagnet is energized.

In operation, the embodiment of FIG. 5 works substantially the same as the previous embodiments. Upon energizing the electromagnet 15 of the magnetic base drill 14, the glide post 24 is retracted within bore 16 against the bias of spring 40. This retraction exposes end 38 and due to the force of the electromagnet being pulled to the work surface and, if desired, the force applied to rod 62, end 38 is driven into the work surface. To ensure proper penetration of end 38, force may be applied to rod 62 to further drive the end 38 into the surface. This is helpful when drilling into a hard surface for example. If a deeper penetration is desired, rod 62 can be screwed into threaded opening 64 to lengthen the protrusion of end 38 past the bottom of the electromagnet 15 of magnetic base drill 14. Alternatively, rod 62 can be backed out of opening 64 to shorten the protrusion.

Figure 6:
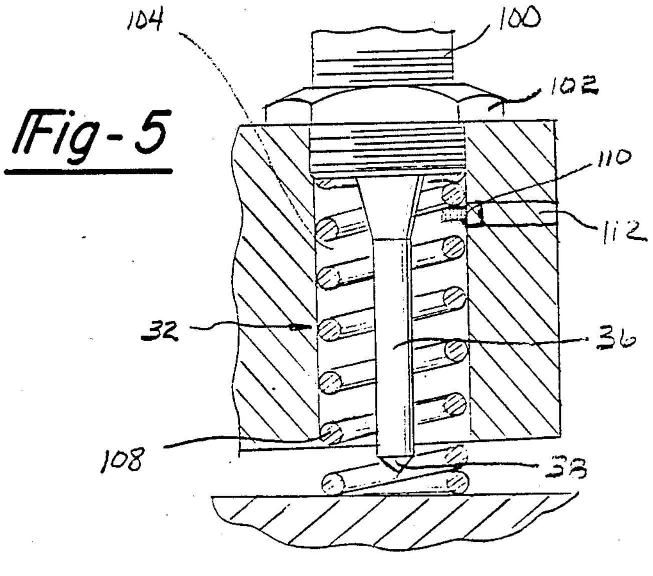
FIG. 6 is a cross-sectional view of a still further embodiment of the present invention.

With reference to FIG. 6, a still further embodiment of the present invention is illustrated. In this embodiment, the glide post 24 of the previous embodiments is replaced with coil spring 108 which performs the function of glide post 24. In this embodiment, the torque reactor point 32 has a body portion 36 ending in a conical end 38 with an externally threaded head portion 100 at the opposite end. A lock nut 102 is threaded onto head portion 100. It should be understood that the torque restraining device 32 illustrated in FIG. 6 could be replaced by any of the previously described torque restraining devices or any equivalent devices which resist torque.

The torque restraining device 32 of FIG. 6 is mounted within a bore 104. A coil spring 108 is mounted around body portion 36 within bore 104. Preferably, spring 108 is held within bore 104 by a set screw 110 which is received with a small internally threaded hole 112 which intersects bore 104. By use of set screw 110, spring 108 can be threaded into bore 104 with set screw 110 being analogous to an internal thread.

As should be apparent, spring 108 functions in the same manner as glide post 24. Spring 108 extends below the bottom of the magnet or mounting bracket to raise the rear of the drill base when the magnet is not energized. When the magnet is energized, the magnet pulls the conical end 38 of reactor point 32 into the work surface and compresses or retracts spring 108 into bore 104. When the magnet is de-energized, spring 108 raises the rear of the drill unit and extracts reactor point 32 from the work surface. Additionally, the rounded wire of coil spring 108 permits easily sliding of the drill unit when the magnet is not energized.

As will be understood, various modifications may be made to this invention within the purview of the following claims. For example, the torque restraining device 10 may be mounted directly within the electromagnet 15 obviating the need for mounting bracket 12. Similarly, the bore 16 may extend from the bottom of bracket 12 or magnetic base 15 without extending through the top. If only a single partial bore is used, the glide post 24 could be retained within the bore by, for example, set screws or other retaining means which would permit the glide post to reciprocate within the bore. Additionally, the glide post of the present invention is readily adapted for use on any type of torque restraining device to protect the pointed end of the torque restraining point and to function as a glide post. As for example, in Hougen's prior patent '673, the glide post of the present invention could be adapted for use on the torque restraining point as a protective sleeve and glide roller. Additionally, the coil spring of FIG. 6 could be used on the device of the '673 patent. Other configurations may be used for the conical point of the reactor. Still further, the present invention is not limited to magnetic base drill. For example, the torque restraining device of the present invention could be used on a drill motor that is held in place by suction cups rather than an electromagnet. It will be apparent to those skilled in the art that the foregoing disclosures are exemplary in nature rather than limiting, the invention being limited only by the appended claims.

What is claimed is:

1. A torque restraining device for use on a drill unit said drill unit having a base for attaching the drill unit to a work surface when said base is activated, said torque restraining device comprising:

a penetrating member mounted on said base, said penetrating member having a free end extending below said base for penetrating a work surface to prevent rotation of said drill unit with respect to said work surface during use; and a protective member mounted about said penetrating member and axially movable with respect to said penetrating member, said protective member extending beyond said penetrating member free end to protect said penetrating member and said protective member axially moving in response to engagement between said protective member and said work surface upon actuation of said base to expose said penetrating member free end for penetration into said work surface;

whereby said penetrating member free end is protected by said protective member when said base is not activated with said protective member retracting to expose said penetrating member when said base is activated so that said penetrating member free end can penetrate said work surface to resist the torque of said drill unit.

2. The torque restraining device of claim 1, wherein said penetrating member includes a shaft portion, said shaft having an outer diameter which is less than the inner diameter of said protective member such that said protective member is reciprocal with respect to said shaft portion.

3. The torque restraining device of caim 1, further including a biasing means mounted adjacent said protective member, said penetrating member free end protruding beyond said base for penetration into said work surface with said protective member being biased by said biasing means to protrude beyond said base and said penetrating member free end to protect said penetrating member and to lift said drill unit with respect to aid work surface, said protective member retracting against said biasing means to expose said penetrating member free end when said base is activated.

4. The torque restraining device of claim 1, wherein said penetrating member includes a top portion and a shaft portion, with said top portion having an outer diameter greater than the outer diameter of said shaft portion; and said protective member includes a flange about one end adjacent said top portion of said penetrating member;

a moving means supported adjacent said flange to force said protective member beyond said penetrating member free end and lift said base of said drill unit and penetrating member free end with respect to said work surface.

5. The torque restraining device of claim 1, further including a bracket mounted to the rear of said drill unit; and a bore extending into said bracket;

said penetrating member and said protective member being mounted within said bore.

6. The torque restraining device of claim 5, wherein said bore includes first and second portions, said first portion extending from the top of said mounting bracket partially through said mounting bracket and ending in said second portion;

said second portion extending from said first portion through the bottom of said mounting bracket, said second portion having a smaller inner diameter than said first portion; and the adjoining ends of said first and second portions forming a supporting ledge within said bore.

7. The torque restraining device of claim 6, wherein said protective member includes a flange about one end thereof, said flange having an outer diameter which is less than the inner diameter of said first portion; said flange being supported upon said ledge with said protective member extending through said second portion beyond the base of said drill unit.

8. The torque restraining device of claim 7, wherein said penetrating member includes a top portion having an outer diameter less than the inner diameter of said first portion of said bore; and a biasing means mounted between said top portion of said penetrating member and said flange of said protective member biasing said protective member against said ledge;

said penetrating member free end protruding beyond said base for penetration into said work surface with said protective member normally biased to protrude beyond said base and said penetrating member free end to protect said member and to lift said drill unit with respect to said work surface, said protective member retracting against the bias of said biasing means to expose said penetrating member free enfd when said base is activated.

9. The torque restraining device of claim 1, wherein said protective member has a rounded free end, said protective member lifting the rear of said drill unit when said base is not activated and said rounded portion permitting said drill unit to be easily moved across said work surface when said drill unit is not activated.

10. The torque restraining device of claim 1, further including a driving means mounted to said drill unit to facilitate the penetration of said penetrating member free end when necessary.

11. The torque restraining device of claim 1, wherein said protective member is a coil spring.

12. A torque restraining device for use on a self adhering drill unit having a bottom surface facing a work surface , said torque restraining device comprising:

a bore opening at the bottom of said self adhering drill unit;

a penetrating member having a free end protruding from said bore beyond the bottom of said self adhering drill unit;

a protective annular sleeve reciprocally mounted within said bore, said penetrating member extending within said annular protective sleeve such that said sleeve axially reciprocates with respect to said penetrating member; and means moving said protective sleeve toward said work surface to raise an adjacent portion of said self adhering drill unit and said penetrating member free end from said work surface enclosing and protecting said penetrating member free end and for permitting retraction of said protective sleeve upon said portion of the self adhering drill adjacent said protective sleeve being intimately brought together with said work surface to expose said penetrating member free end for penetration into said work surface;

whereby said penetrating member free end is protected by said protective sleeve when said self adhering drill unit is not adhering to the work surface with said protective sleeve retracting into said bore to expose said penetrating member free end when said self adhering drill unit is adhering to the work surface so that said penetrating member free end can penetrate said work surface to resist the torque of said self adhering drill unit when said drill unit is operating.

13. The torque restraining member of claim 12, wherein said penetrating member includes a body portion having an outer diameter which is less than the inner diameter of said protective sleeve so that said protective sleeve is reciprocal with respect to said body portion.

14. The torque restraining device of claim 13, wherein said penetrating member includes a head portion having an outer diameter greater than the outer diameter of said body portion; and said protective sleeve includes a flange member about one end adjacent said head portion of said penetrating member;

said moving means being mounted between said head portion and said flange member to force said protective sleeve against said work surface.

15. The torque restraining member of claim 12, further including a bracket means mounted to a rear portion of said self adhering drill unit; said bore extending through said bracket means;

said penetrating member free end and said protective sleeve being mountd within said bore.

16. The torque restraining device of claim 15, wherein said bore includes first and second portions, said first portion extending from the top of said mounting bracket partially through said mounting bracket ending in said second portion;

said second portion extending from said first portion through the bottom of said mounting bracket, said second portion having a smaller diameter than said first portion;

the adjoining ends of said first and second portions forming a supporting ledge within said bore.

17. The torque restraining device of claim 16, wherein said protective sleeve includes a flange about one end thereof, said flange having an outer diameter which is less than the inner diameter of said first portion; said flange being supported upon said ledge with said protective sleeve extending through said second portion.

18. The torque restraining device of claim 17, wherein said penetrating member includes a head portion having an outer diameter less than the inner diameter of said first portion; and said moving means being mounted between said head portion and said flange portion biasing said protective sleeve against said ledge;

said penetrating member free end protruding beyond said self adhering drill unit for penetration into said work surface with said protective sleeve normally moved to protrude beyond said self adhering drill unit and said penetrating member free end to protect said penetrating member and to lift said self adhering drill unit with respect to said work surface, said protective sleeve retracting against said moving means to expose said penetrating member free end when said self adhering drill unit is activated.

19. The torque restraining member of claim 12, wherein said protective sleeve has a rounded free end permitting said self adhering drill unit to be easily moved across the work surface when said self adhering drill unit is not activated.

20. The torque restraining device of claim 12, further including a driving means mounted to said self adhering drill unit to facilitate the penetration of said penetrating member when necessary.

21. The torque restraining member of claim 12, wherein said bore has a longitudinal center line intersecting the longitudinal center line of said self adhering drill unit.

22. A torque restraining device for use on a self adhering drill unit to resist the rotational torque of said drill as said drill is cutting a hole in a work surface, said torque restraining device comprising:

a mounting bracket mounted to a rear portion of said self adhering drill unit, said bracket having a bore extending therethrough with first and second portions, said first portion extending from the top of said mounting bracket part way through said mounting bracket ending in said second portion which extends from said first portion through the bottom of said mounting bracket; the adjoining ends of said first and second portions forming a supporting ledge within said bore;

a glide post having a tubular body with a flange at one end and a rounded free end reciprocally mounted within said bore, said flange being supported upon said ledge with said free end extending through said second portion beyond the bottom of said mounting bracket;

a penetrating member having a body portion and a free end, said body portion extending into said glide post with said glide post being axially movable with respect to said body portion and said free end extending below said mounting bracket;

means normally moving said glide post toward said work surface to raise an adjacent portion of said self adhering drill unit and said penetrating member free end from said work surface normally enclosing and protecting said penetrating member free end;

a retaining plug mounted in the open end of said first portion of said bore to retain said penetrating member, glide post and moving means within said bore;

whereby said glide post is moved by said moving means to normally extend below the bottom of said mounting bracket encasing said free end of said penetrating member to protect said free end and raising said adjacent portion of said self adhering drill unit, permitting said self adhering drill unit to be easily slid upon said work surface; upon activation said glide post being forced against said biasing means exposing said free end which is forced into said work surface.

23. The torque restraining device of claim 22, wherein said retaining plug includes a driving means to facilitate the embedding of said penetrating member.

24. The torque restraining device of claim 22, further including a driving means mounted on said mounting bracket to facilitate the penetration of said penetrating member.

25. A magnetic base drill having a torque restraining device, said magnetic base drill including an electromagnetic base having a generally flat bottom surface, a drill mounted on said magnetic base, energizing means for energizing said electromagnetic base electromagnetically adhering said bottom surface to a ferromagnetic work surface, and a torque restraining device operatively mounted on said base spaced from said drill to resist torque generated by said drill, said torque restraining device comprising:

a penetrating member operable fixed to said base having a free end extending below said bottom surface, said penetrating member free end having a relatively sharp piercing surface for penetrating said work surface when said electormagnetic base is energized;

a protective sleeve telescopically mounted on said penetrating member having a free end telescopically extensible below said penetrating member free end; and means moving said protective sleeve toward said work surface to raise an adjacent portion of said magnetic base and said penetrating member free end from said work surface enclosing and protection said penetrating member free end and for permitting retraction of said protective sleeve upon contact with said work surface and the energizing of said electromagnetic bas to expose said penetrating member free end for penetration into said work surface said energizing means energizing said electromagnetic base drawing said base bottom surface into magnetic contact with said work surface, retracting said sleeve free end against said work surface and telescopically retracting said sleeve and driving said penetrating member free end into said work surface.

26. A magnetic base drill unit including an electromagnetic base, a rotary drill fixed relative to said base and a torque restraining device, said electromagnetic base having a generally flat base surface magnetically adhering said magnetic base drill to a ferrous worksurface when said electromagnetic base is energized, said torque restraining device fixed relative to said electromagnetic base, spaced from said rotary drill including a torque reactor pin having a free end extending below said electromagnetic base surface, said torque reactor pin free end having a relatively sharp end penetrating said work surface when said electromagnetic base is energized to resist torque generated by said rotary drill, a pin protector member having a free end at least partially surrounding said pin free end, and said protector member including means resiliently biasing said protector member free end against said work surface to lift said electromagnetic base from said worksurface adjacent said pin enclosing and protecting said pin free end when said electromagnetic base is de-energized, and said protector member free end retracting to expose sad pin free end when said electromagnetic base is energized to cause said pin free end to penetrate said work surface to resist torque generated by said rotary drill.

27. The magnetic base drill unit defined in claim 26, characterized in that said protector member comprises a resilient helical spring surrounding said torque reactor pin free end and said means comprising the resiliency of said helical spring.

28. The magnetic base drill unit defined in claim 27, characterized in that said helical spring free end having an end loop extending generally parallel to said electromagnetic base surface and said end loop generally circular in cross section to allow said electromagnetic base to be easily slid over said worksurface when said electromagnetic base is de-energized.

29. The electromagnetic base drill unit defined in claim 26, characterized in that said protector member comprises a generally tubular sleeve surrounding said torque reactor pin and said means comprises a spring resiliently biasing said sleeve toward said work surface.

30. The magnetic base drill unit of claim 26, includes a bracket fixed relative to said electromagnetic base, said bracket including a bore extending through a bottom surface adjacent said electromagnetic base surface and said protector member and biasing means received within said bracket bore with said pin free end extending through said bore below said electromagnetic base surface.

* * * * *